US010519846B2

(12) United States Patent
Kamiya et al.

(10) Patent No.: US 10,519,846 B2
(45) Date of Patent: Dec. 31, 2019

(54) EXHAUST PIPE SUPPORT BODY

(71) Applicants: SUMITOMO RIKO COMPANY LIMITED, Komaki-shi, Aichi (JP); HONDA MOTOR CO., LTD., Tokyo (JP)

(72) Inventors: Yuichi Kamiya, Komaki (JP); Daisuke Torizuka, Wako (JP)

(73) Assignees: SUMITOMO RIKO COMPANY LIMITED, Komaki-shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/013,555

(22) Filed: Jun. 20, 2018

(65) Prior Publication Data

US 2019/0101042 A1 Apr. 4, 2019

(30) Foreign Application Priority Data

Sep. 29, 2017 (JP) .................................. 2017-189671

(51) Int. Cl.
*F01N 13/18* (2010.01)
*F16L 55/035* (2006.01)

(52) U.S. Cl.
CPC ........ *F01N 13/1822* (2013.01); *F16L 55/035* (2013.01)

(58) Field of Classification Search
CPC ........................... F01N 13/1822; F16L 55/035
See application file for complete search history.

(56) References Cited

U.S. PATENT DOCUMENTS 4,550,795 A * 11/1985 Teshima ................. B60K 13/04
180/296
4,638,965 A * 1/1987 De Bruine .......... F01N 13/1822
180/89.2

(Continued)

FOREIGN PATENT DOCUMENTS

JP S61-12260 Y2 4/1986
JP H11-280460 A 10/1999

(Continued)

OTHER PUBLICATIONS

Jun. 26, 2018 Office Action issued in Japanese Patent Application No. 2016-105868.

(Continued)

*Primary Examiner* — Anita M King
(74) *Attorney, Agent, or Firm* — Oliff PLC

(57) ABSTRACT

An exhaust pipe support body including: an attachment member configured to be attached to one of a vehicle body and an exhaust pipe; a center attachment part configured to be attached to another of the vehicle body and the exhaust pipe, the center attachment part having a vertical lengthwise dimension that is larger than a lateral widthwise dimension thereof and being arranged in an installation hole provided to the attachment member; and a plurality of connection arms elastically connecting the center attachment part to the attachment member, the connection arms being integrally formed with the center attachment part and remote from each other in a vertical lengthwise direction between opposed faces of each of left and right sides of the center attachment part and corresponding one of left and right side walls of the installation hole.

7 Claims, 5 Drawing Sheets

(56) References Cited

U.S. PATENT DOCUMENTS

| | | | | |
|---|---|---|---|---|
| 4,660,797 A | * | 4/1987 | Tonnies | F16F 1/387 248/60 |
| 5,271,595 A | * | 12/1993 | Simon | B60K 13/04 180/291 |
| 5,575,461 A | * | 11/1996 | Ihle | F01N 13/1822 267/141 |
| 6,402,119 B1 | * | 6/2002 | Miska | B60K 13/04 248/58 |
| 6,454,236 B2 | | 9/2002 | Garaud et al. | |
| 6,739,557 B2 | * | 5/2004 | Kato | B60K 13/04 248/58 |
| 6,851,506 B2 | | 2/2005 | Bovio | |
| 6,863,154 B2 | | 3/2005 | Uegane et al. | |
| 7,510,043 B2 | | 3/2009 | Cerri, III | |
| 7,575,216 B2 | * | 8/2009 | Zimmermann | B60K 13/04 248/60 |
| 7,637,472 B2 | * | 12/2009 | Endo | B60K 13/04 180/309 |
| 8,366,069 B2 | * | 2/2013 | Rodecker | F01N 13/1805 180/296 |
| 2009/0230601 A1 | * | 9/2009 | Lenda | B60K 13/04 267/141.1 |
| 2017/0342890 A1 | | 11/2017 | Torizuka | |

FOREIGN PATENT DOCUMENTS

| | | |
|---|---|---|
| JP | 2002-371838 A | 12/2002 |
| JP | 2003-254055 A | 9/2003 |
| JP | 2005-155440 A | 6/2005 |
| JP | 2013-231469 A | 11/2013 |

OTHER PUBLICATIONS

Jun. 21, 2018 Office Action issued in U.S. Appl. No. 15/603,740.
Feb. 12, 2018 Office Action issued in U.S. Appl. No. 15/603,740.
Mar. 13, 2018 Office Action issued in Japanese Patent Application No. 2016-105868.

* cited by examiner

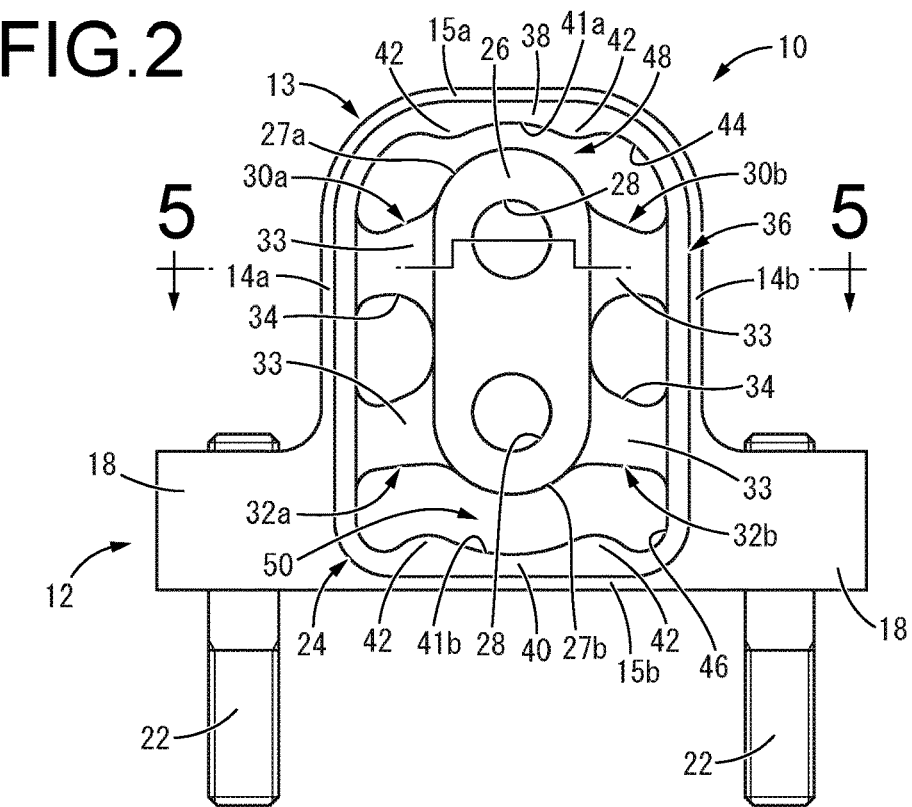
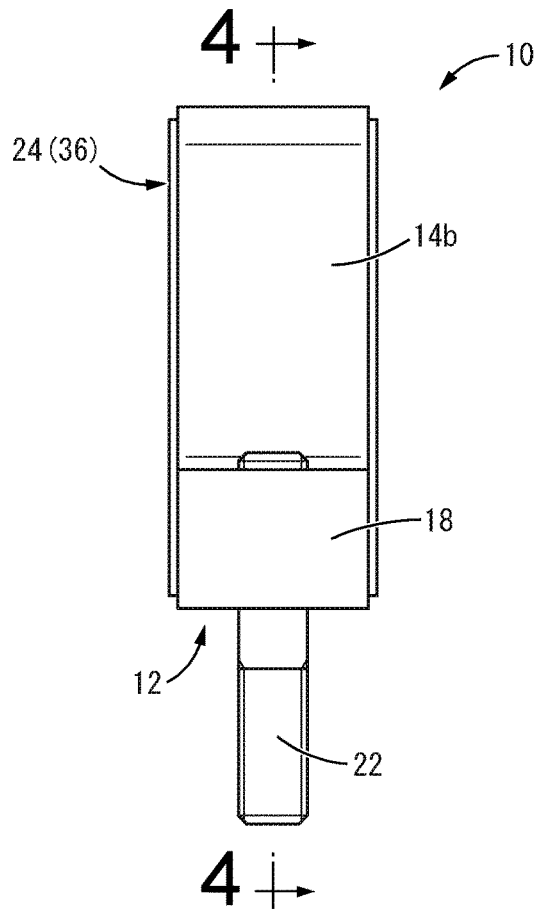

EXHAUST PIPE SUPPORT BODY

INCORPORATED BY REFERENCE

The disclosure of Japanese Patent Application No. 2017-189671 filed on Sep. 29, 2017 including the specification, drawings and abstract is incorporated herein by reference in its entirety.

BACKGROUND OF THE INVENTION

1. Field of the Invention

The present invention relates to an exhaust pipe support body for connecting an exhaust pipe to a vehicle body in a vibration damping manner.

2. Description of the Related Art

Conventionally, there is known an exhaust pipe support body adapted to connect an exhaust pipe to a vehicle body in a vibration damping manner. The exhaust pipe support body includes, for example, like an exhaust isolator disclosed in U.S. Pat. No. 7,510,043, a tubular sleeve to which a vehicle body is attached, and an elastomeric isolator bonded to and arranged in the inner radius of the sleeve. The elastomeric isolator includes in its center portion an inside sleeve having a passage hole to which an exhaust pipe is attached.

Meanwhile, to the exhaust pipe support body, not only inputs in the vertical direction and in the lateral direction, but also force in the rotational direction may be exerted. In particular, in a case in which the exhaust pipe is supported by being suspended from the vehicle body via the exhaust pipe support body, rotational force is likely to be input to the exhaust pipe support body due to the exhaust pipe swinging in the lateral direction.

However, with the structure disclosed in U.S. Pat. No. 7,510,043, during relative rotation of the sleeve and the inside sleeve, forces in the direction of tension and in the direction of shearing are primarily exerted on the elastomeric isolator that elastically connects the sleeve and the inside sleeve. This sometimes makes it difficult to obtain soft spring characteristics required in the vertical direction while obtaining spring rigidity of the elastomeric isolator for support with respect to input in the rotational direction.

SUMMARY OF THE INVENTION

It is therefore one object of this invention to provide an exhaust pipe support body of novel structure which is able to obtain spring characteristics required in the vertical direction while obtaining large spring rigidity for support with respect to input in the rotational direction.

The above and/or optional objects of this invention may be attained according to at least one of the following modes of the invention. The following modes and/or elements employed in each mode of the invention may be adopted at any possible optional combinations.

Specifically, a first mode of the present invention provides an exhaust pipe support body comprising: an attachment member configured to be attached to one of a vehicle body and an exhaust pipe; a center attachment part configured to be attached to another of the vehicle body and the exhaust pipe, the center attachment part having a vertical lengthwise dimension that is larger than a lateral widthwise dimension thereof and being arranged in an installation hole provided to the attachment member; and a plurality of connection arms elastically connecting the center attachment part to the attachment member, the connection arms being integrally formed with the center attachment part and remote from each other in a vertical lengthwise direction between opposed faces of each of left and right sides of the center attachment part and corresponding one of left and right side walls of the installation hole.

With the exhaust pipe support body of construction according to the first mode, the center attachment part has a vertically elongated shape, and the connection arms arranged between the laterally opposed faces of each of the left and right outer surfaces of the center attachment part and the corresponding inner surface of the installation hole of the attachment member are provided in plurality so as to be remote from each other in the vertical direction. With this configuration, in the case in which rotational force in the circumferential direction is exerted between the center attachment part and the attachment member, the connection arms are compressed on both the left and right sides of the center attachment part, and the rotational force is primarily received by the compression spring component of the connection arms. This makes it possible to obtain large spring rigidity for support, thereby elastically positioning the exhaust pipe in an effective manner.

Besides, since the plurality of connection arms are provided so as to be vertically remote from each other, it is possible to set the spring characteristics in the vertical direction due to the connection arms to be soft. This makes it possible to sufficiently obtain spring rigidity for support in the rotational direction while tuning the spring characteristics in the vertical direction with a larger degree of freedom.

A second mode of the present invention provides the exhaust pipe support body according to the first mode, wherein the connection arms slope in a vertical direction from the center attachment part toward the left and right side walls of the installation hole, and a slope angle of the connection arms is configured to become smaller due to input of a support load of the exhaust pipe.

With the second mode, tensile strain of the connection arms due to action of the static support load of the exhaust pipe will be reduced, thereby improving durability of the connection arms. Moreover, in the mounted state of the exhaust pipe support body on the vehicle, in which the support load of the exhaust pipe is input, the compression spring component of the connection arms acts more mainly with respect to input in the lateral direction. This makes it possible to set the spring in the lateral direction to be harder in the connection arms, thereby effectively limiting the amount of displacement of the exhaust pipe relative to the vehicle body.

A third mode of the present invention provides the exhaust pipe support body according to the first or second mode, wherein the center attachment part includes a plurality of attachment holes to which the other of the vehicle body and the exhaust pipe is configured to be attached, and the attachment holes are remote from each other in the vertical lengthwise direction.

With the third mode, the member on the vehicle body side or on the exhaust pipe side, which is mounted by insertion in the attachment hole, can be prevented from slipping and rotating within the attachment hole during input of the rotational force. Thus, the exhaust pipe support body is able to limit the amount of displacement of the exhaust pipe relative to the vehicle body with excellent reliability.

A fourth mode of the present invention provides the exhaust pipe support body according to any one of the first through third modes, further comprising upper and lower stoppers that are configured to limit an amount of elastic deformation of the connection arms, the stoppers being provided by abutment between each of upper and lower sides of the center attachment part and corresponding one of upper and lower walls of the installation hole.

With the fourth mode, tensile stress acting on the connection arms during input in the vertical direction will be minimized, thereby improving durability of the connection arms with respect to input in the vertical direction.

A fifth mode of the present invention provides the exhaust pipe support body according to the fourth mode, further comprising cushioning rubbers covering both upper and lower sides of an inner surface of the installation hole, wherein upper and lower outer surfaces of the center attachment part constitute convex curved surfaces that curve in a peripheral direction, and faces of the cushioning rubbers that are vertically opposed to the center attachment part constitute concave curved surfaces corresponding to the upper and lower outer surfaces of the center attachment part.

With the fifth mode, for the upper and lower stoppers, the center attachment part and the attachment member come into abutment via the cushioning rubber, so that impact or noise during abutment will be moderated.

Moreover, for example, there is the case in which the center attachment part and the attachment member vertically displace in the state of deviating in the lateral direction or relatively rotating in the circumferential direction, and the center attachment part and the attachment member come into abutment via the cushioning rubbers, or the like. In such case, since the upper and lower outer surfaces of the center attachment part constitute convex curved surfaces while the upper and lower inner surfaces of the cushioning rubbers constitute concave curved surfaces, due to the abutment of the center attachment part and the cushioning rubbers, the center attachment part and the attachment member will be guided to the applicable relative positions in the lateral direction.

A sixth mode of the present invention provides the exhaust pipe support body according to any one of the first through fifth modes, wherein the connection arms include a tapered portion whose vertical dimension becomes smaller as it goes away from the center attachment part.

With the sixth mode, at least one of the upper and lower surfaces of the connection arm has tapered contours in the tapered portion. Accordingly, in comparison with the connection arm that includes upper and lower surfaces of non-tapered contours that extend between the opposed faces of the center attachment part and the attachment member in the shortest distance, the length dimension of the upper and lower surfaces of the connection arm in the direction of connection, and hence the area of upper and lower free surfaces are made large. Thus, stress will be dispersed in the upper and lower surfaces of the connection arm during elastic deformation of the connection arm due to input, so as to improve durability of the connection arms.

A seventh mode of the present invention provides the exhaust pipe support body according to any one of the first through sixth modes, further comprising through holes formed vertically between the connection arms and provided over left and right entire lengths of the connection arms, wherein an inner surface of the through holes constitutes a curved surface that continues smoothly.

With the seventh mode, the through holes are provided over the left and right entire lengths of the connection arms. Accordingly, stress transmission or mutual restraint between the connection arms and the like will be avoided, thereby obtaining a great degree of freedom in tuning spring characteristics of the connection arms. Moreover, the inner surface of the through holes that constitutes the surface of the connection arm has a smooth curved surface. Thus, during elastic deformation, stress concentration will be prevented, thereby improving durability.

An eighth mode of the present invention provides the exhaust pipe support body according to any one of the first through seventh modes, wherein the center attachment part projects to both front and back outer sides of the connection arms.

With the eighth mode, the front-back thickness dimension of the center attachment part is made larger than that of the connection arms. This configuration makes it possible to obtain large deformation rigidity of the center attachment part, so as to achieve large strength for mounting onto the vehicle body or the exhaust pipe. Besides, the front-back thickness dimension of the connection arms is made smaller than that of the center attachment part. With this configuration, it is possible to obtain rigidity and strength of the center attachment part while setting the spring in the vertical direction of the connection arms to be soft, thereby attaining a great degree of freedom in tuning the spring characteristics of the connection arms.

A ninth mode of the present invention provides the exhaust pipe support body according to any one of the first through eighth modes, wherein the attachment member includes left and right attachment parts configured to be attached to one of the vehicle body and the exhaust pipe, the left and right attachment parts being arranged to left and right outer sides of the installation hole.

With the ninth mode, the attachment parts of the attachment member to be attached to the vehicle body or the exhaust pipe constitute the left and right attachment parts arranged to the left and right outer sides of the installation hole, thereby achieving large strength for attaching to the vehicle body or the exhaust pipe. Indeed, with the structure in which the attachment parts of the attachment member are arranged to the left and right outer sides of the installation hole, rotational force in the circumferential direction is likely to act between the center attachment part and the attachment member. However, the rotational force will be received by the compression spring component of the connection arms, making it possible to obtain the spring rigidity for support, durability and the like of the connection arms with respect to the rotational force.

According to the present invention, the center attachment part has a vertically elongated shape, and the connection arms arranged between the laterally opposed faces of each of the left and right outer surfaces of the center attachment part and the corresponding inner surface of the installation hole of the attachment member are provided in plurality so as to be remote from each other in the vertical direction. With this configuration, the rotational force acting between the center attachment part and the attachment member can be received by the compression spring component of the connection arms, thereby advantageously obtaining positioning effect of the exhaust pipe owing to large spring rigidity for support. Besides, with the structure in which the connection arms are provided in plurality so as to be remote from each other in the vertical direction, spring characteristics can also be set to be sufficiently soft in the vertical direction in particular, which is the main vibration input direction. Thus, it is possible to sufficiently obtain spring rigidity for support in the rotational direction while improving a degree of freedom in tuning and vibration damping support characteristics.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein:

FIG. 2 is a front view of the exhaust pipe support body of FIG. 1;

FIG. 3 is a right side view of the exhaust pipe support body of FIG. 1;

DETAILED DESCRIPTION OF EMBODIMENTS

Figure 1:
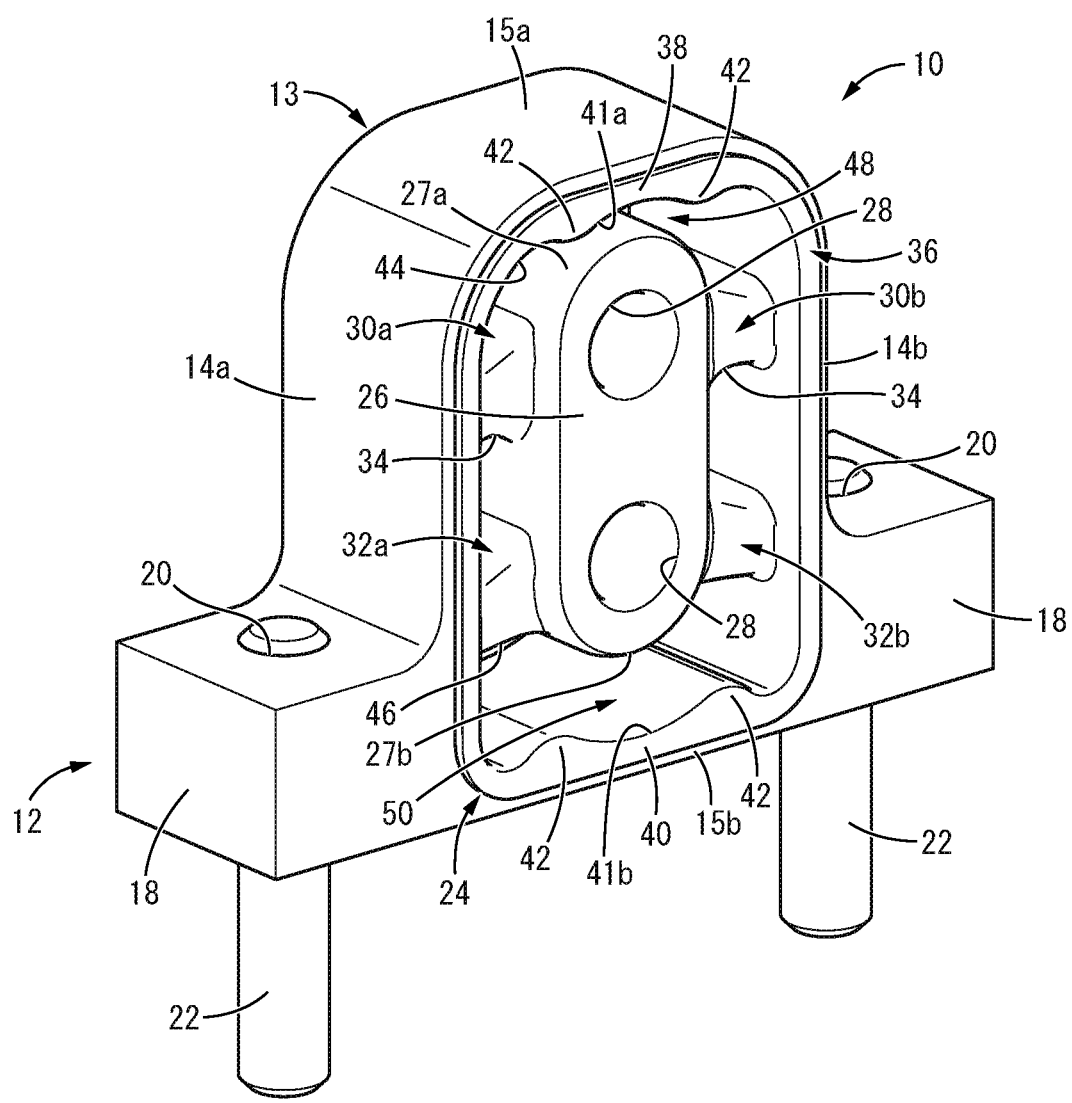
FIG. 1 is a perspective view showing an exhaust pipe support body according to a first embodiment of the present invention.

An embodiment of the present invention will be described below in reference to the drawings.

Referring first to FIGS. 1 through 5, there is depicted an exhaust pipe support body 10 according to a first embodiment of the present invention. In the description hereinbelow, as a general rule, the vertical direction refers to the vertical direction in FIG. 2, the lateral direction refers to the lateral direction in FIG. 2, and the front-back direction refers to the lateral direction in FIG. 3.

Described more specifically, the exhaust pipe support body 10 includes an attachment member 12 of metal. The attachment member 12 is formed of metal such as iron or aluminum alloy, and includes a tubular part 13 extending in the front-back direction. With the attachment member 12 of the present embodiment, the tubular part 13 has a cross sectional shape of generally rounded quadrangle, and includes left and right side walls 14a, 14b and upper and lower walls 15a, 15b. Besides, the tubular part 13 has the axis-perpendicular dimension in the vertical direction that is made larger than the axis-perpendicular dimension in the lateral direction, thereby exhibiting a vertically elongated cross sectional shape. With this configuration, an installation hole 16, which is a center hole of the tubular part 13, has the inside dimension in the vertical direction that is made larger than the inside dimension in the lateral direction. The attachment member 12 is not necessarily made of metal, but may be made of synthetic resin or the like.

Additionally, the attachment member 12 includes left and right attachment parts 18, 18. The left and right attachment parts 18, 18 have a flat plate shape that extends roughly orthogonal to the vertical direction, and project laterally outward from the lower end portion of the tubular part 13 so as to be arranged to the left and right outer sides of the installation hole 16 of the tubular part 13. In the present embodiment, the lower surface of the left and right attachment parts 18, 18 extends so as to be roughly flush with the outer peripheral lower surface of the tubular part 13. Meanwhile, the upper surface of the left and right attachment parts 18, 18 has a curved surface at its connected end with the tubular part 13 (laterally inner end) that slopes upward to the laterally inner side, so as to be smoothly continuous with the outer peripheral surface of the tubular part 13.

Moreover, the left and right attachment parts 18, 18 are each vertically perforated by a screw hole 20, and an implanted bolt 22 is threaded onto the screw hole 20. The implanted bolt 22 is threaded onto the screw hole 20 at its upper male thread portion, while its lower male thread portion projects downward from the left and right attachment parts 18, 18.

To the attachment member 12, a main rubber elastic body 24 is bonded. The main rubber elastic body 24 is bonded to the tubular part 13 of the attachment member 12, and in the present embodiment, the main rubber elastic body 24 takes the form of an integrally vulcanization molded component incorporating the attachment member 12.

More specifically, the main rubber elastic body 24 includes a center attachment part 26 arranged in the inner radius of the tubular part 13 of the attachment member 12. The center attachment part 26 has a roughly elliptical pillar shape extending in the front-back direction, with a vertically elongated cross sectional shape whose vertical lengthwise dimension is made larger than the lateral widthwise dimension thereof. Besides, the upper surface of the center attachment part 26 constitutes a convex curved surface 27a that slopes downward from the lateral center toward the outer sides, while the lower surface of the center attachment part 26 constitutes a convex curved surface 27b that slopes upward from the lateral center toward the outer sides.

Moreover, the center attachment part 26 is perforated by two attachment holes 28, 28 in the front-back direction. The attachment holes 28 extends straightly in the front-back direction with a roughly circular cross section, and the two attachment holes 28, 28 are remote from each other in the vertical lengthwise direction. The inner circumferential surface of the attachment hole 28 has tapered contours whose front-side opening end gradually becomes larger in diameter toward the front, which makes it easy to insert a stay 56 described later.

The center attachment part 26 is arranged in the installation hole 16 of the tubular part 13 of the attachment member 12, and the center attachment part 26 and the attachment member 12 are elastically connected by left and right connection arms 30a, 30b and by left and right connection arms 32a, 32b that are integrally formed with the center attachment part 26. The connection arms 30a, 30b and the connection arms 32a, 32b are vertically remote from each other. The upper connection arms 30a, 30b extend from the left and right side surfaces of the upper portion of the center attachment part 26 to the left and right sides respectively, and each of the left and right outer ends thereof is bonded to the corresponding one of the left and right side walls 14a, 14b of the tubular part 13. Meanwhile, the lower connection arms 32a, 32b extend from the left and right side surfaces of the lower portion of the center attachment part 26 to the left and right sides respectively, and each of the left and right outer ends thereof is bonded to the corresponding one of the left and right side walls 14a, 14b of the tubular part 13.

Additionally, with each of the upper connection arms 30a, 30b and the lower connection arms 32a, 32b, a portion close to the center attachment part 26 constitutes a tapered portion 33 whose vertical dimension becomes smaller as it goes away from the center attachment part 26 to the laterally outside. With this configuration, each of the upper and lower surfaces of the connection arms 30a, 30b, 32a, and 32b constitutes a sloping surface. Accordingly, in comparison with the case in which the upper and lower surfaces constitute a non-sloping surface that extends in the direction orthogonal to the vertical direction, the connection arms 30a, 30b, 32a, and 32b may obtain a large free surface, thereby improving durability of the connection arms 30a, 30b, 32a, and 32b due to dispersion of stress.

Furthermore, the upper connection arms 30a, 30b and the lower connection arms 32a, 32b all slope downward from the center attachment part 26 toward the side walls 14a, 14b of the installation hole 16. Namely, the lateral elastic principal axis of the upper connection arm 30a indicated by the chain double-dashed line in FIG. 4 slopes at the slope angle α with respect to the lateral direction indicated by the dot-and-dash line. Meanwhile, the lateral elastic principal axis of the lower connection arm 32a indicated by the chain double-dashed line in FIG. 4 slopes at the slope angle β with respect to the lateral direction indicated by the dot-and-dash line. Whereas in FIG. 4, the lateral elastic principal axes of the left-side connection arms 30a, 32a are depicted, since the right-side connection arms 30b, 32b each have a roughly symmetrical shape to the left-side connection arms 30a, 32a in the lateral direction, the lateral elastic principal axes of the right-side connection arms 30b, 32b slope at the respective slope angles α, β with respect to the lateral direction.

In the present embodiment, the upper connection arms 30a, 30b are laterally symmetrical in shape to each other, while the lower connection arms 32a, 32b are laterally symmetrical in shape to each other. On the other hand, the upper connection arms 30a, 30b and the lower connection arms 32a, 32b are vertically asymmetrical in shape to each other, namely, have mutually different shapes. Specifically, with the laterally inside portion of the upper connection arms 30a, 30b (tapered portion 33), the upper surface has tapered contours that slope downward as it goes away from the center attachment part 26 in the lateral direction, while the lower surface has tapered contours that slope upward as it goes away from the center attachment part 26 in the lateral direction, thereby gradually becoming vertically thinner as it goes laterally outward. On the other hand, with the laterally inside portion of the lower connection arms 32a, 32b (tapered portion 33), both the upper and lower surfaces have tapered contours that slope downward as it goes away from the center attachment part 26 in the lateral direction.

Moreover, vertically between the upper connection arm 30a and the lower connection arm 32a and vertically between the upper connection arm 30b and the lower connection arm 32b, there is formed a middle through hole 34 which serves as a through hole perforating in the front-back direction. In other words, the upper connection arm 30a and the lower connection arm 32a are remote from each other in the vertical direction with the middle through hole 34 in between, while the upper connection arm 30b and the lower connection arm 32b are remote from each other in the vertical direction with the middle through hole 34 in between. With the middle through hole 34 of the present embodiment, the inner surface, which is defined by the side surface of the center attachment part 26, the lower surface of the upper connection arm 30a/30b, the upper surface of the lower connection arm 32a/32b, and the left/right inner surface of a covering rubber layer 36, constitutes a curved surface that continues smoothly over roughly its entirety, so that during deformation of the main rubber elastic body 24 due to input described later, dispersion of stress can be exhibited. Besides, the middle through hole 34 of the present embodiment is provided vertically between the upper connection arm 30a/30b and the lower connection arm 32a/32b over the left and right entire lengths of the connection arms 30a/30b and 32a/32b. Thus, the upper and lower connection arms 30a/30b and 32a/32b are vertically remote from each other over the left and right entire lengths thereof.

Figure 5:
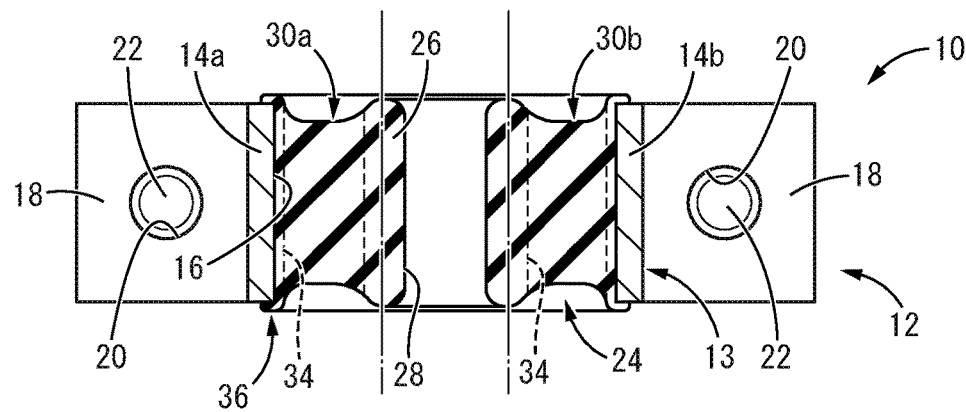
FIG. 5 is a cross sectional view taken along line 5-5 of FIG. 2.

In the present embodiment, as shown in FIG. 5, the center attachment part 26 has the thickness dimension in the front-back direction larger than the thickness dimension of the upper connection arms 30a, 30b and the lower connection arms 32a, 32b in the front-back direction. Namely, the center attachment part 26 projects to both front and back outer sides of the upper connection arms 30a, 30b and the lower connection arms 32a, 32b. In the present embodiment, the connection arms 30a, 30b, 32a, and 32b are configured such that the dimension of the center attachment part 26-side end in the front-back direction gradually becomes larger as it goes close to the center attachment part 26. Accordingly, the connection arms 30a, 30b, 32a, and 32b are smoothly continuous with the center attachment part 26 without steps at the connected section to the center attachment part 26 on both the front and back surfaces. Meanwhile, the minimum value of the front-back dimension of the connection arms 30a, 30b, 32a, and 32b is made smaller than the maximum value of the front-back dimension of the center attachment part 26. Besides, the minimum value of the thickness dimension of the center attachment part 26 can be recognized as the dimension between opposite ends in the thickness direction of the outer peripheral surface thereof that extends straightly in the thickness direction at the portion where the connection arms 30a, 30b, 32a, and 32b are not provided, and the thickness dimension of the connection arms 30a, 30b, 32a, and 32b is not greater than that minimum value of the thickness dimension of the center attachment part 26.

Additionally, the upper connection arms 30a, 30b and the lower connection arms 32a, 32b are connected to each other at the left and right outer ends by the tubular covering rubber layer 36. The covering rubber layer 36 is formed so as to cover the radially inner surface of the tubular part 13 of the attachment member 12 over its entirety, and extends to front and back outer sides of the tubular part 13 and is bonded to the front and back end surfaces of the tubular part 13 as well. With this configuration, large adherence strength with respect to the tubular part 13 in the front-back direction (resistance to dislodgement) is obtained.

Furthermore, the covering rubber layer 36 includes cushioning rubbers 38, 40 constituted by the upper and lower inner surfaces of the upper and lower walls 15a, 15b of the tubular part 13, in other words, the portions that cover the both upper and lower sides of the radially inner surface of the installation hole 16. At least the lateral center portion of the cushioning rubbers 38, 40 has a concave groove shape that opens vertically inward, so that the upper and lower inside surfaces at that portion of the cushioning rubbers 38, 40 constitute concave curved surfaces 41a, 41b. Specifically, the lower surface of the lateral center portion of the upper cushioning rubber 38 constitutes a concave curved surface 41a roughly corresponding to the upper surface of the center attachment part 26, while the upper surface of the lateral center portion of the lower cushioning rubber 40 constitutes a concave curved surface 41b roughly corresponding to the lower surface of the center attachment part 26.

In the present embodiment, the cushioning rubbers 38, 40 have a laterally symmetrical shape. At the lateral middle of the cushioning rubbers 38, 40, there are provided two mountain parts 42 whose vertical thickness dimension is made large, and the section laterally between the mountain parts 42, 42 has a concave shape that opens vertically inward. Additionally, in the present embodiment, the lateral distance between the two mountain parts 42, 42 provided to the upper cushioning rubber 38 is made smaller than the lateral distance between the two mountain parts 42, 42 provided to the lower cushioning rubber 40. Moreover, the lateral distance between the apexes of the mountain parts 42, 42 of the upper cushioning rubber 38 is made smaller than the lateral dimension of the center attachment part 26, while the lateral distance between the apexes of the mountain parts 42, 42 of the lower cushioning rubber 40 is made larger than the lateral dimension of the center attachment part 26.

Also, vertically between the center attachment part 26 and the upper connection arms 30a, 30b on one side and the upper cushioning rubber 38 on the other, there is formed an upper through hole 44 that passes through in the front-back direction. Besides, vertically between the center attachment part 26 and the lower connection arms 32a, 32b on one side and the lower cushioning rubber 40 on the other, there is formed a lower through hole 46 that passes through in the front-back direction. These through holes 44, 46 provide prescribed stopper clearances vertically between the center attachment part 26 and the upper and lower cushioning rubbers 38, 40.

When the center attachment part 26 undergoes a large displacement in the vertical direction relative to the attachment member 12, the center attachment part 26 comes into abutment against the upper and lower walls 15a, 15b via the cushioning rubbers 38, 40. With this configuration, an upper stopper 48 for limiting the amount of elastic deformation of the center attachment part 26 in the upward direction with respect to the attachment member 12 and a lower stopper 50 for limiting the amount of elastic deformation of the center attachment part 26 in the downward direction with respect to the attachment member 12 are provided by abutment between the center attachment part 26 and the upper and lower walls 15a, 15b of the tubular part 13. Accordingly, the upper stopper 48 and the lower stopper 50 constitute the upper and lower stoppers of the present embodiment.

Figure 6:
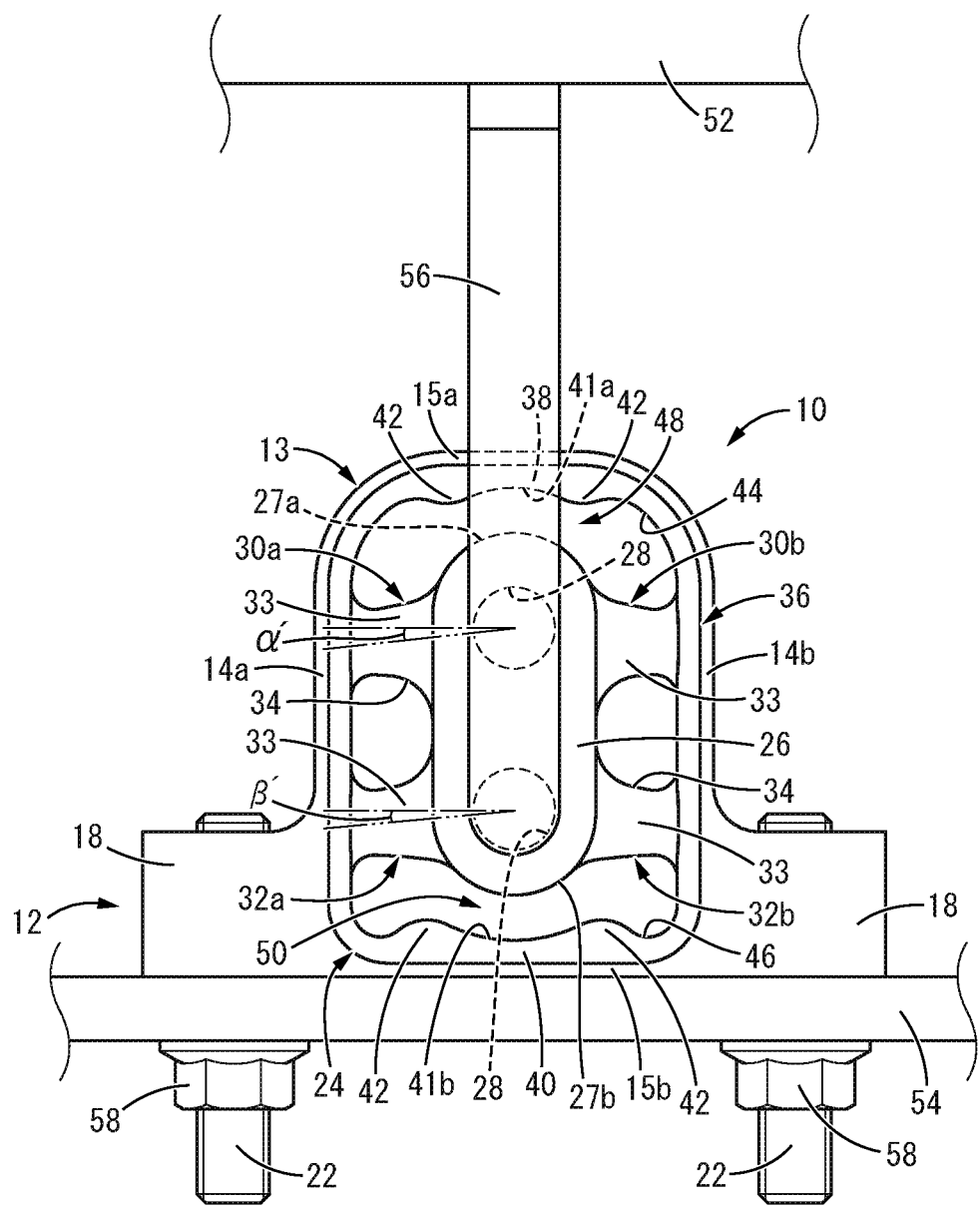
FIG. 6 is a front view showing the exhaust pipe support body of FIG. 1 in a mounted state on a vehicle.
Figure 7:
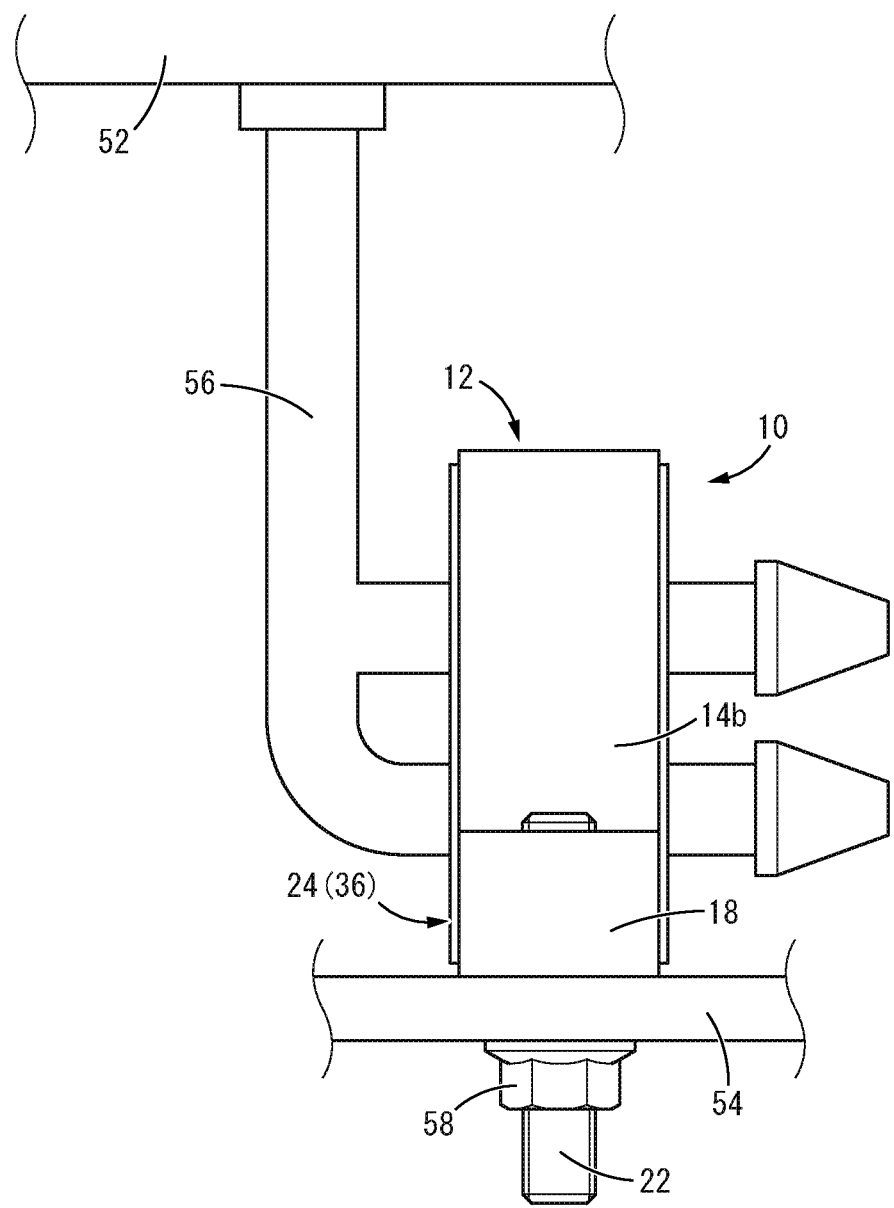
FIG. 7 is a right side view showing the exhaust pipe support body of FIG. 1 in the mounted state on the vehicle.

With the exhaust pipe support body 10 of the above construction, as shown in FIGS. 6 and 7, the center attachment part 26 is configured to be attached to an exhaust pipe 52, while the attachment member 12 is configured to be attached to a vehicle body 54, so that the exhaust pipe 52 is configured to be connected to the vehicle body 54 in a vibration damping manner via the exhaust pipe support body 10.

Specifically, by a stay 56 provided to the exhaust pipe 52 being inserted into the attachment holes 28, 28, the center attachment part 26 is attached to the exhaust pipe 52. The stay 56 of the present embodiment extends downward from the exhaust pipe 52, with its lower end vertically branched into two forks, and each branched portion extending backward. The branched portions are inserted into the respective attachment holes 28, 28 from the front. Moreover, the branched portion of the stay 56 includes at its back end part a large-diameter part, and the outer peripheral surface of the large-diameter part has tapered contours whose diameter becomes smaller toward the back end side. The front end of the large-diameter part is made larger in diameter than the attachment holes 28, 28 so as to be less prone to slip out, while the back end of the large-diameter part is made smaller in diameter than the attachment holes 28, 28 so as to be easy to insert.

Meanwhile, by the implanted bolts 22, 22 provided to the left and right attachment parts 18, 18 of the attachment member 12 being inserted into bolt holes (not shown) provided to the vehicle body 54 and by a nut 58 being fastened to each implanted bolt 22, the attachment member 12 is attached to the vehicle body 54.

In the present embodiment, the exhaust pipe 52 is fixed by welding, bolts, or the like to the upper end of the stay 56 that extends upward from the center attachment part 26. With this arrangement, in the state in which the exhaust pipe support body 10 is mounted on the vehicle, a static support load (1W) of the exhaust pipe 52 is configured to act downward on the center attachment part 26. Accordingly, the center attachment part 26 is, in the mounted state on the stay 56 as shown in FIGS. 6 and 7, displaced further downward with respect to the attachment member 12 than in the isolated state as shown in FIG. 2. In the mounted state on the vehicle in which the center attachment part 26 is displaced downward with respect to the attachment member 12, the stopper clearances at both the upper and lower sides of the center attachment part 26 are roughly the same as each other.

Figure 4:
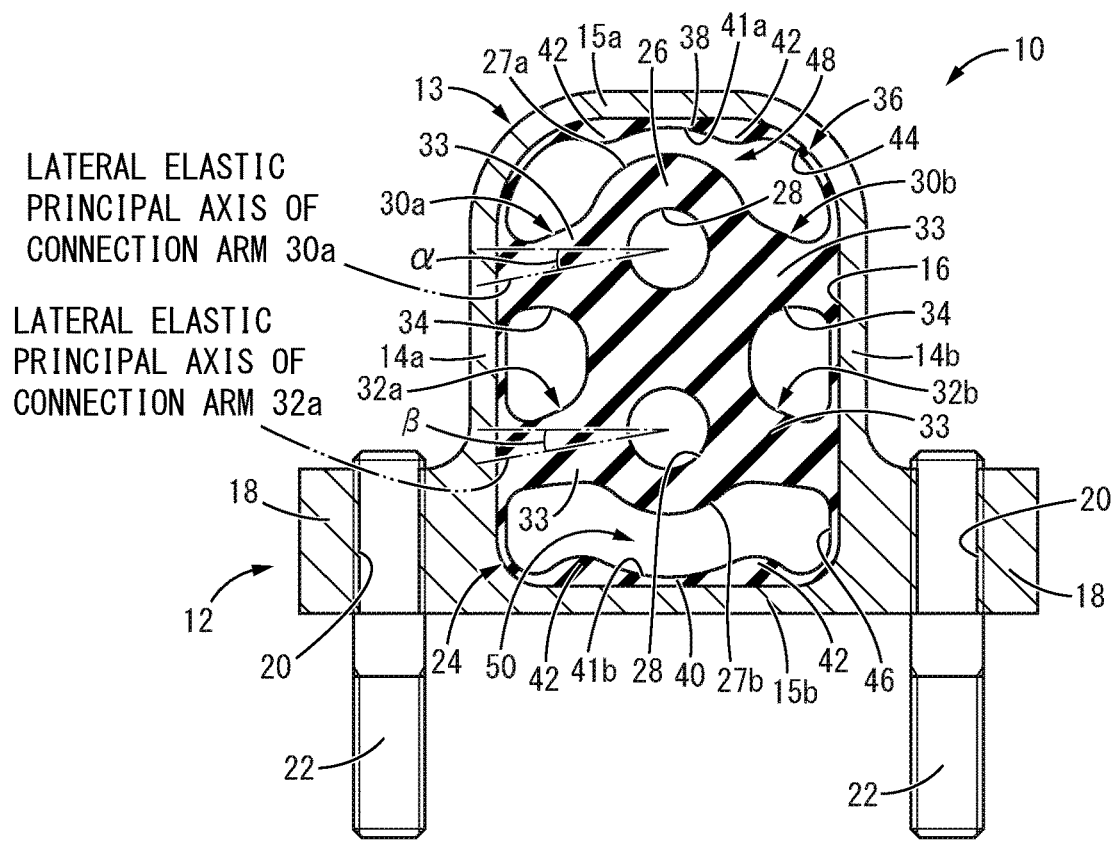
FIG. 4 is a cross sectional view taken along line 4-4 of FIG. 3.

With the exhaust pipe support body 10, in the isolated state prior to being mounted on the vehicle, the upper connection arms 30a, 30b and the lower connection arms 32a, 32b each have tapered contours that slope upward to the center attachment part 26 side (laterally inner side). Therefore, by the center attachment part 26 being displaced downward with respect to the attachment member 12 due to the support load of the exhaust pipe 52, the slope angle of the upper connection arms 30a, 30b and the lower connection arms 32a, 32b becomes smaller. Specifically, the slope angle α' of the upper connection arm 30a and the slope angle β' of the lower connection arm 32a in the mounted state onto the vehicle as shown in FIG. 6 are smaller than the slope angle α of the upper connection arm 30a and the slope angle β of the lower connection arm 32a in the isolated state prior to being mounted on the vehicle as shown in FIG. 4. With this configuration, tensile stress exerted on the connection arms 30a, 30b, 32a, and 32b due to input of the support load of the exhaust pipe 52 is reduced, thereby improving durability of the connection arms 30a, 30b, 32a, and 32b.

Also, with the exhaust pipe support body 10 of the present embodiment, the left and right attachment parts 18, 18, which are a fixing structure to the vehicle body 54 side, are provided to the left and right outer sides of the installation hole 16 of the tubular part 13. Thus, the distance laterally between the left and right attachment parts 18, 18 is greatly obtained, so that the attachment member 12 is fixed to the vehicle body 54 with large fixing strength.

Besides, in the mounted state of the exhaust pipe support body 10 on the vehicle, an amount of displacement of the exhaust pipe 52 relative to the vehicle body 54 is configured to be limited by the exhaust pipe support body 10.

Specifically, when the exhaust pipe 52 displaces with respect to the vehicle body 54 in the lateral direction, the left-side connection arms 30a, 32a or the right-side connection arms 30b, 32b of the exhaust pipe support body 10 undergo compressive deformation. Accordingly, the amount of displacement of the exhaust pipe 52 is limited due to compression spring of the left-side connection arms 30a, 32a or the right-side connection arms 30b, 32b.

In the present embodiment in particular, when used in the state in which the support load of the exhaust pipe 52 is exerted, the slope angle of the connection arms 30a, 30b, 32a, and 32b is made smaller. Thus, with respect to input in the lateral direction, compression spring component acts more predominately on the connection arms 30a, 30b, 32a, and 32b. This makes it easy to set hard spring characteristics in the lateral direction to the connection arms 30a, 30b, 32a, and 32b, thereby effectively limiting the amount of displacement of the exhaust pipe 52 relative to the vehicle body 54 owing to the exhaust pipe support body 10.

When the exhaust pipe 52 and the vehicle body 54 rotate relative to each other, rotational force in the circumferential direction is input between the center attachment part 26 attached to the exhaust pipe 52 and the tubular part 13 of the attachment member 12 attached to the vehicle body 54. Then, the upper connection arm 30a/30b on either one of the left and right sides and the lower connection arm 32b/32a on the other of the left and right sides (for example, the connection arm 30*a* and the connection arm 32*b*) each undergo compressive deformation. Accordingly, with respect to input in the rotational direction as well, a hard spring can be obtained owing to the compression spring component of the connection arm 30*a*/30*b* and the connection arm 32*b*/32*a*. Thus, by limiting the amount of relative rotation of the center attachment part 26 and the tubular part 13 of the attachment member 12, it is possible to limit the amount of relative displacement between the exhaust pipe 52 and the vehicle body 54.

In this way, the center attachment part 26 has a vertically elongated shape and there are provided a plurality of connection arms 30*a*, 30*b*, 32*a*, and 32*b* that are remote from each other in the vertical direction. Thus, during relative rotation of the center attachment part 26 and the tubular part 13 of the attachment member 12, it is possible to excellently obtain effect of limiting the amount of relative rotation owing to the compression spring component of the connection arms 30*a*, 30*b*, 32*a*, and 32*b*. Moreover, input in the rotational direction is received by the compression spring of some of the connection arms 30*a*, 30*b*, 32*a*, and 32*b*. This makes it possible to prevent a large tensile stress from acting on the others of the connection arms 30*a*, 30*b*, 32*a*, and 32*b* which are not compressed, thereby enhancing durability of the connection arms 30*a*, 30*b*, 32*a*, and 32*b*.

In the present embodiment, the center attachment part 26 includes the upper and lower two attachment holes 28, 28, and the stay 56 is inserted into the two attachment holes 28, 28, so that the center attachment part 26 is configured to be attached to the exhaust pipe 52 via the stay 56. In this way, since the stay 56 is inserted into the two attachment holes 28, 28 that are vertically remote from each other in a parallel arrangement, relative rotation of the stay 56 and the center attachment part 26 is prevented. Thus, the amount of displacement of the exhaust pipe 52 relative to the vehicle body 54 will be effectively limited owing to the exhaust pipe support body 10.

Besides, with the exhaust pipe support body 10, when a small-amplitude vibration in the vertical direction is input between the center attachment part 26 and the attachment member 12, vibration damping effect due to shear deformation of the connection arms 30*a*, 30*b*, 32*a*, and 32*b* (vibration insulating action due to low dynamic spring) will be exhibited, thereby preventing vibration transmission from the exhaust pipe 52 to the vehicle body 54.

Moreover, since the upper connection arms 30*a*, 30*b* and the lower connection arms 32*a*, 32*b* are vertically remote from each other, shear spring of each of the connection arms 30*a*, 30*b*, 32*a*, and 32*b* can be set small, thereby advantageously obtaining vibration insulating action with respect to vibration input in the vertical direction. Therefore, with such exhaust pipe support body 10, by providing the connection arms 30*a*, 30*b*, 32*a*, and 32*b* that are vertically remote from each other, with respect to the input in the rotational direction, high spring rigidity for support can be obtained owing to the compression spring, while with respect to the input in the vertical direction, excellent vibration damping ability can be realized by setting the shear spring small.

Additionally, in the present embodiment, the dimension in the front-back direction of the connection arms 30*a*, 30*b*, 32*a*, and 32*b* is made smaller than that of the center attachment part 26. This makes it easy to set the shear spring of the connection arms 30*a*, 30*b*, 32*a*, and 32*b* small, thereby advantageously attaining vibration damping effect with respect to the input in the vertical direction.

On the other hand, when the exhaust pipe 52 undergoes large displacement with respect to the vehicle body 54 in the vertical direction, in the exhaust pipe support body 10, the center attachment part 26 attached to the exhaust pipe 52 comes into abutment against the upper and lower walls 15*a*, 15*b* of the tubular part 13 of the attachment member 12 attached to the vehicle body 54 via the cushioning rubbers 38, 40. By so doing, the amount of relative displacement of the center attachment part 26 and the attachment member 12 in the vertical direction will be limited by the upper and lower stoppers 48, 50, thereby limiting the amount of relative displacement of the exhaust pipe 52 attached to the center attachment part 26 and the vehicle body 54 attached to the attachment member 12 in the vertical direction.

Furthermore, in the present embodiment, the upper and lower outer surfaces of the center attachment part 26 constitute the convex curved surfaces 27*a*, 27*b* that curve in the peripheral direction so as to be convex toward the upper and lower outer sides, while the upper and lower inner surfaces of the upper and lower cushioning rubbers 38, 40 constitute the concave curved surfaces 41*a*, 41*b* roughly corresponding to the upper and lower outer surfaces of the center attachment part 26 (convex curved surfaces 27*a*, 27*b*). With this configuration, for example, in the case in which input in the vertical direction is exerted together with input in the lateral direction, by the convex curved surfaces 27*a*, 27*b* of the center attachment part 26 coming into abutment against the concave curved surfaces 41*a*, 41*b* provided to the upper and lower inner surfaces of the cushioning rubbers 38, 40, the center attachment part 26 and the attachment member 12 bonded to the cushioning rubbers 38, 40 will be relatively guided to the lateral center, which is the laterally neutral position. Accordingly, the amount of relative displacement of the center attachment part 26 and the attachment member 12 due to input in the lateral direction will be limited by the guiding effect of the upper and lower stoppers 48, 50.

Also, the dimension in the front-back direction of the center attachment part 26 is made larger than that of the connection arms 30*a*, 30*b*, 32*a*, and 32*b*. This configuration obtains large deformation rigidity of the center attachment part 26, so as to limit the amount of relative displacement between the center attachment part 26 and the stay 56 caused by elastic deformation of the center attachment part 26, thereby more advantageously limiting the amount of displacement of the exhaust pipe 52 with respect to the vehicle body 54.

Besides, in the present embodiment, the left and right attachment parts 18, 18 are arranged to left and right outer sides of the installation hole 16 of the tubular part 13, so as to obtain a large distance between those left and right attachment parts 18, 18. Accordingly, relative rotational force is likely to input between the attachment member 12 and the center attachment part 26. Here, with the exhaust pipe support body 10 of the present embodiment, the compression spring of the connection arms 30*a*, 30*b*, 32*a*, and 32*b* is able to receive the input in the rotational direction. Therefore, the exhaust pipe support body 10 of the present embodiment makes it possible to obtain large fixing strength or the like while achieving sufficient spring rigidity for support, and durability with respect to the rotational input.

An embodiment of the present invention has been described in detail above, but the present invention is not limited to those specific descriptions. For example, it may be acceptable to provide three or more connection arms that are vertically remote from one another. Moreover, the specific shape of each of the connection arms 30*a*, 30*b*, 32*a*, and 32*b* shown in the preceding embodiment is merely exemplary, and can be modified appropriately depending on the required spring characteristics or the like.

It could also be acceptable to provide a single attachment hole 28 or three or more attachment holes 28. Also, the cross-sectional shape of the attachment hole 28 is not limited in particular, but may be, for example, an elliptical cross-sectional shape. By so doing, even in the case in which only a single attachment hole 28 is provided, it is possible to prevent the stay 56 from slipping and rotating within the attachment hole 28.

The attachment parts of the attachment member 12 configured to be attached to the vehicle body 54 are not necessarily arranged to left and right outer sides of the installation hole 16. It would also be possible, for example, to provide a bolt projecting downward from the lower wall 15b of the tubular part 13, and to attach the attachment member 12 to the vehicle body 54 with that bolt.

It would also be acceptable to provide a reinforcing fitting that reinforces the center attachment part 26. Specifically, an annular or tubular reinforcing fitting that extends around the outer peripheral portion of the center attachment part 26 in the peripheral direction may be bonded, or it may also be possible to bond an annular or tubular reinforcing fitting so as to surround the periphery of each of the attachment holes 28, 28.

It may be configured such that the center attachment part 26 is attached to the vehicle body 54 side, while the attachment member 12 is attached to the exhaust pipe 52 side.

The exhaust pipe support body 10 may also be used for supporting a muffler provided to the end of the exhaust pipe 52 or the like, in addition to being used for supporting the engine-side end or the middle portion of the exhaust pipe 52.

What is claimed is:

1. An exhaust pipe support body comprising:
    an attachment member configured to be attached to one of a vehicle body and an exhaust pipe;
    a center attachment part configured to be attached to another of the vehicle body and the exhaust pipe, the center attachment part having a vertical lengthwise dimension that is larger than a lateral widthwise dimension thereof and being arranged in an installation hole provided to the attachment member; and
    a plurality of connection arms elastically connecting the center attachment part to the attachment member, the connection arms being integrally formed with the center attachment part and remote from each other in a vertical lengthwise direction between opposed faces of each of left and right sides of the center attachment part and corresponding one of left and right side walls of the installation hole,
    wherein the center attachment part includes a plurality of attachment holes to which the other of the vehicle body and the exhaust pipe is configured to be attached, and the attachment holes are remote from each other in the vertical lengthwise direction; and
    the connection arms include a tapered portion whose vertical dimension becomes smaller as it goes away from the center attachment part.

2. The exhaust pipe support body according to claim 1, wherein the connection arms slope in a vertical direction from the center attachment part toward the left and right side walls of the installation hole, and a slope angle of the connection arms is configured to become smaller due to input of a support load of the exhaust pipe.

3. The exhaust pipe support body according to claim 1, further comprising upper and lower stoppers that are configured to limit an amount of elastic deformation of the connection arms, the stoppers being provided by abutment between each of upper and lower sides of the center attachment part and corresponding one of upper and lower walls of the installation hole.

4. The exhaust pipe support body according to claim 1, further comprising through holes formed vertically between the connection arms and provided over left and right entire lengths of the connection arms, wherein an inner surface of the through holes constitutes a curved surface that continues smoothly.

5. The exhaust pipe support body according to claim 1, wherein the center attachment part projects to both front and back outer sides of the connection arms.

6. The exhaust pipe support body according to claim 1, wherein the attachment member includes left and right attachment parts configured to be attached to one of the vehicle body and the exhaust pipe, the left and right attachment parts being arranged to left and right outer sides of the installation hole.

7. An exhaust pipe support body comprising:
    an attachment member configured to be attached to one of a vehicle body and an exhaust pipe;
    a center attachment part configured to be attached to another of the vehicle body and the exhaust pipe, the center attachment part having a vertical lengthwise dimension that is larger than a lateral widthwise dimension thereof and being arranged in an installation hole provided to the attachment member;
    a plurality of connection arms elastically connecting the center attachment part to the attachment member, the connection arms being integrally formed with the center attachment part and remote from each other in a vertical lengthwise direction between opposed faces of each of left and right sides of the center attachment part and corresponding one of left and right side walls of the installation hole;
    upper and lower stoppers that are configured to limit an amount of elastic deformation of the connection arms, the stoppers being provided by abutment between each of upper and lower sides of the center attachment part and corresponding one of upper and lower walls of the installation hole; and
    cushioning rubbers covering both upper and lower sides of an inner surface of the installation hole, wherein upper and lower outer surfaces of the center attachment part constitute convex curved surfaces that curve in a peripheral direction, and faces of the cushioning rubbers that are vertically opposed to the center attachment part constitute concave curved surfaces corresponding to the upper and lower outer surfaces of the center attachment part.

* * * * *